United States Patent
Mahony, Jr.

(10) Patent No.: US 9,744,989 B1
(45) Date of Patent: Aug. 29, 2017

(54) CONTROL SYSTEM FOR STEERING A REAR CASTER WHEEL

(71) Applicant: DANFOSS POWER SOLUTIONS INC., Ames, IA (US)

(72) Inventor: Glenn Mark Mahony, Jr., Greenville, SC (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 0 days.

(21) Appl. No.: 15/138,312

(22) Filed: Apr. 26, 2016

(51) Int. Cl.
| | |
|---|---|
| B62D 5/06 | (2006.01) |
| B62D 5/26 | (2006.01) |
| B62D 5/065 | (2006.01) |
| B62D 9/00 | (2006.01) |
| B62D 5/08 | (2006.01) |

(52) U.S. Cl.
CPC ............. B62D 5/062 (2013.01); B62D 5/065 (2013.01); B62D 5/08 (2013.01); B62D 5/26 (2013.01); B62D 9/002 (2013.01)

(58) Field of Classification Search
CPC .......... B62D 5/06; B62D 5/061; B62D 5/062; B62D 5/065; B62D 5/08; B62D 5/26; B62D 9/00; B62D 9/002; B62D 11/005
USPC ................ 180/403, 417, 421, 422, 423, 441
See application file for complete search history.

(56) References Cited

U.S. PATENT DOCUMENTS

| | | | | |
|---|---|---|---|---|
| 4,301,881 A | * | 11/1981 | Griffin | B62D 11/04 180/6.48 |
| 6,650,979 B1 | * | 11/2003 | Kreft | B60T 8/326 303/140 |
| 6,923,289 B1 | * | 8/2005 | MacLeod | B62D 3/14 180/403 |
| 6,923,290 B1 | * | 8/2005 | MacLeod | B62D 3/14 180/403 |
| 7,918,304 B2 | * | 4/2011 | Perry | A01D 34/82 180/403 |
| 8,353,377 B2 | | 1/2013 | Geiger et al. | |
| 8,496,256 B2 | | 7/2013 | Bebernes et al. | |
| 8,925,672 B2 | | 1/2015 | Bebernes et al. | |
| 2004/0211615 A1 | * | 10/2004 | Oxley | B62D 11/06 180/307 |
| 2009/0266071 A1 | * | 10/2009 | Yasuda | B60K 17/356 60/484 |
| 2011/0297473 A1 | * | 12/2011 | Krahn | B62D 5/30 180/422 |
| 2014/0138165 A1 | * | 5/2014 | Bebernes | B62D 11/04 180/6.3 |
| 2015/0223386 A1 | | 8/2015 | Nafziger et al. | |

* cited by examiner

*Primary Examiner* — Jacob Knutson
(74) *Attorney, Agent, or Firm* — Zarley Law Firm, P.L.C.

(57) ABSTRACT

A hydraulic control system for steering rear caster wheels of a work machine. The control system has a steering mode that proportionally controls the steering of rear caster wheels while compensating the circuit to keep steering performance independent from the load generated by the rear caster wheels, a no steering mode that maintains the position of the rear caster wheels in the absence of a steering command, and a freewheeling mode that permits the rear caster wheels to rotate freely 360°.

3 Claims, 2 Drawing Sheets

CONTROL SYSTEM FOR STEERING A REAR CASTER WHEEL

BACKGROUND OF THE INVENTION

This invention is directed to a hydraulic control steering system and more particularly to a hydraulic control steering system for a rear caster wheel.

Work machines sometimes include one or more caster wheels which are carried by a machine frame and are free to rotate about a generally vertical axis 360°. As an example, self-propelled Windrowers are typically driven through a dual-path hydrostatic system. Speed changes are made by adjusting the speed of both drive (front) wheels simultaneously. Direction changes are made by adjusting the relative speed of the drive wheels. The rear wheels are castered to allow the machine to pivot during direction changes.

When direction changes are made, hydraulic pressure builds in one drive wheel circuit to increase speed and is reduced in the other drive wheel to lower the speed. The pressure difference continues until the inertia of the machine and the turn resistance of the casters are overcome. When turn resistance is high enough to create a delay in reaction to the steering wheel input, control of the machine can be difficult.

Due to the machine's inherent instability, the steering system is not ideal for high speed transport. Better machine control is needed at higher speeds without sacrificing the spin steer agility of the system at lower speeds. Also, improved machine handling is needed when towing an attachment. Thus, a control system is desired that addresses these deficiencies.

An objective of the present invention is to provide a control system that provides proportional steering control to rear caster wheels while also allowing for the wheels to rotate freely upon command.

Another objective of the present invention is to provide a control system that provides better machine control when towing an attachment.

A still further objective of the present invention is to provide better machine control and higher transport speed when driving on a road.

These and other objectives will be apparent to those skilled in the art based upon the following written description, drawings and claims.

SUMMARY OF THE INVENTION

A control system for steering one or more rear caster wheels on a work machine that has at least one hydraulic circuit. The hydraulic circuit has three modes of operation. The first is a normal steering mode where the rear caster wheel is turned in response to a steering command independent of the load generated by the rear caster wheel. The second is a no steering mode where the position of the rear caster wheel is maintained. The third is a freewheeling steering command that permits the rear caster wheel to spin freely 360°.

Preferably, in the normal steering mode, the hydraulic circuit has fluid supplied from a pump port that flows through a proportional solenoid valve to a rear caster wheel steering cylinder port. A logic element valve is added to the circuit so that the circuit is compensated and the steering performance will be independent of both the load generated by the rear caster wheel and the input pressure. For the freewheeling steering mode, a solenoid valve and a plurality of pilot operated check valves are included in the circuit such that when the solenoid valve is energized, a signal is sent to open the pilot operated check valves providing a free path for fluid to flow from the rear caster wheel cylinders to a discharge tank and also from the tank to the rear caster wheels.

DETAILED DESCRIPTION OF THE PREFERRED EMBODIMENT

Figure 1:
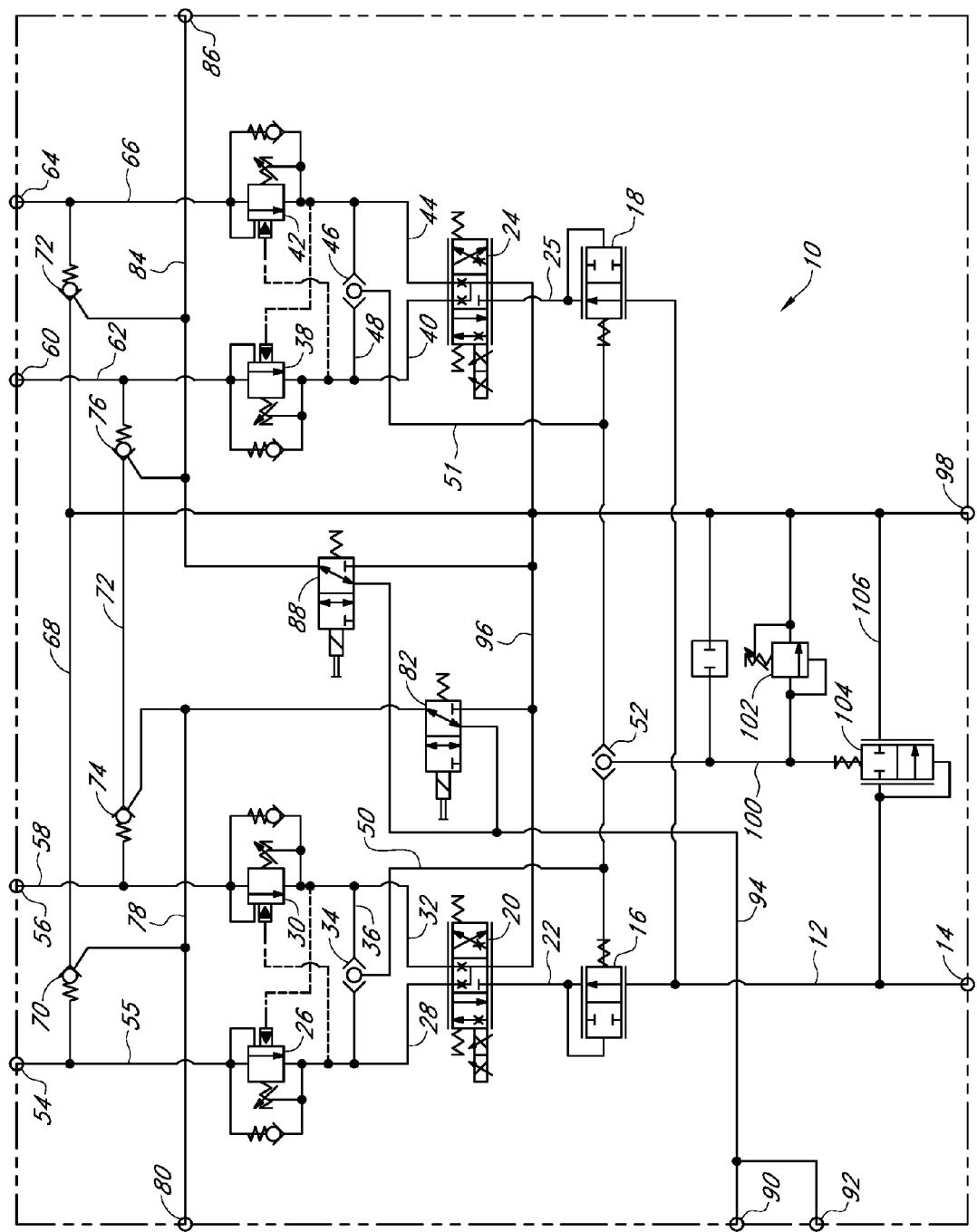
FIG. 1 is a schematic view of a hydraulic circuit of a control system for steering a rear caster wheel to be supplied with hydraulic fluid using, for example, a fixed displacement pump.

Referring to FIG. 1, a hydraulic control system 10 is shown to control the steering of the rear caster wheel(s) of a work machine. While not shown, the rear caster wheel typically is coupled to a chassis and has a sensor and one or more steering cylinders configured to control a steering position of the rear caster wheel.

The control system 10 has a fluid supply line 12 connected to a gear pump (not shown) through port 14. Fluid line 12 is connected to and in fluid communication with logic element valves 16 and 18. Logic element valve 16 is connected to a proportional solenoid valve 20 via line 22 and logic element valve 18 is connected to proportional solenoid valve 24 via line 25.

Proportional solenoid valve 20 is connected to counterbalance valve 26 via line 28 and counterbalance valve 30 via line 32. A shuttle valve 34 is connected to lines 28 and 32 and is also connected to logic element valve 16 via line 50.

Similarly, proportional solenoid valve 24 is connected to counterbalance valve 38 via line 40 and counterbalance valve 42 via line 44. A shuttle valve 46 is connected to lines 40 and 44 and is also connected to logic element valve 18 via line 51. Shuttle valves 34 and 46 are also connected to a third shuttle valve 52, which is also connected between logic element valves 16 and 18.

Counterbalance valve 26 is connected to a first port 54 connected to a cylinder (not shown) for steering a left rear caster wheel via line 55 and counterbalance valve 30 is connected to a second port 56 connected to the same cylinder via line 58. Counterbalance valve 38 is connected to a first port 60 connected to a cylinder (not shown) for steering a right rear caster wheel via line 62 and counterbalance valve 42 is connected to a second port 64 connected to the same cylinder via line 66.

Line 55 is also connected to pilot operated check valve 70 and line 58 is connected to pilot operated check valve 74. Line 62 is also connected to pilot operated check valve 76 and line 66 is also connected to pilot operated check valve 72. Check valves 70 and 74 are connected to line 78 which is connected to a left pilot pressure gauge port 80 at one end and to a solenoid valve 82 at an opposite end. Check valves 72 and 76 are connected to line 84 which is connected to a right pilot pressure gauge port 86 at one end and to a solenoid check valve 88 at an opposite end.

Solenoid valves 82 and 88 are connected to a pilot pump port 90 and pilot pressure gauge port 92 via line 94.

Line 68, which serves as a discharge tank line, is connected to a tank port 98. Proportional valves 20 and 24, solenoid valves 82 and 88, and check pilot operated check valves 70, 72, 74, and 76 are also connected to line 68. Shuttle valve 52 is connected to discharge line 68 via line 100 having a relief valve 102 and to logic element valve 104. Logic element valve 104 is connected to line 106, which is connected to supply line 12 and discharge line 68.

Figure 2:
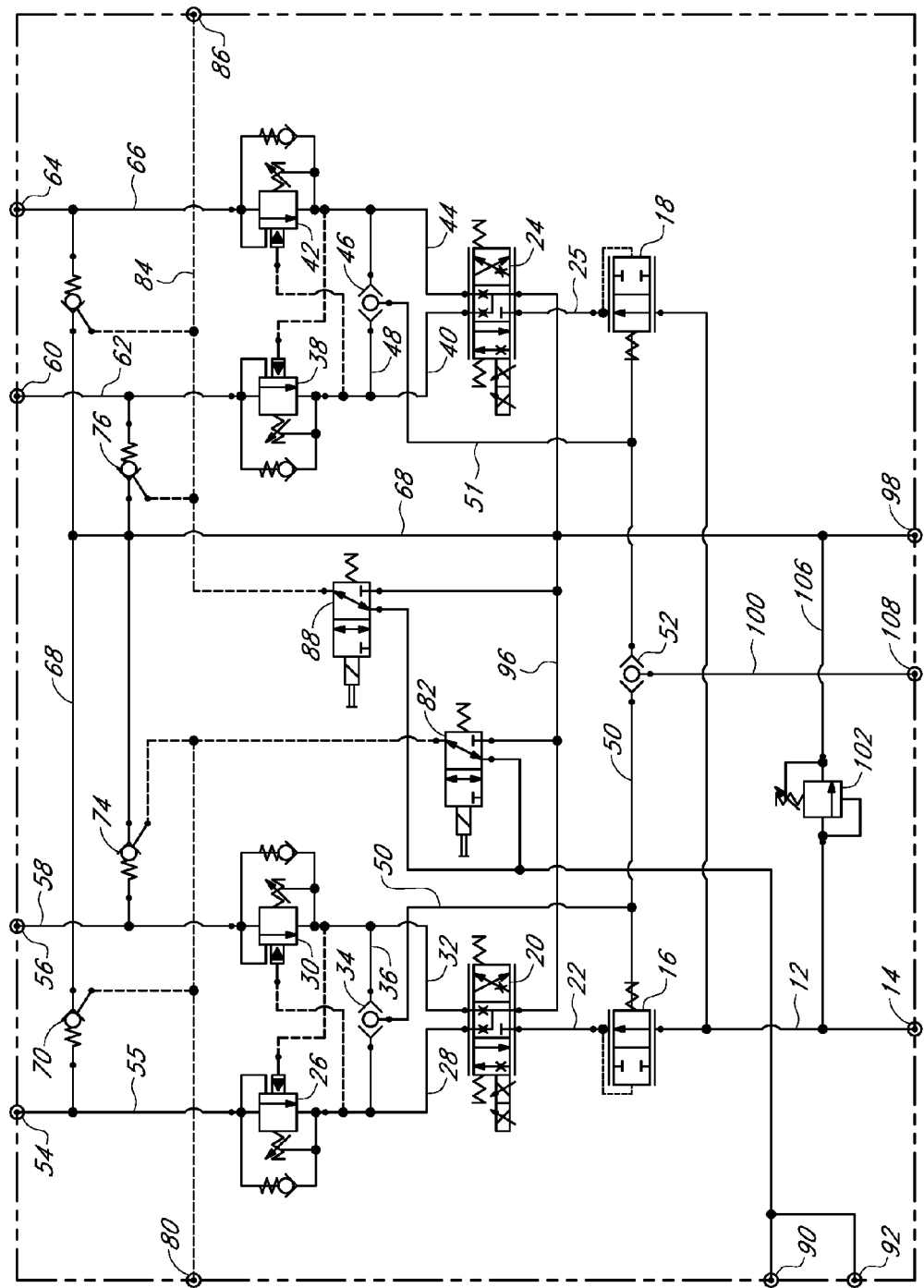
FIG. 2 is a schematic view of a hydraulic circuit of a control system for steering a rear caster wheel to be supplied with hydraulic fluid using, for example, a variable displacement pump.

Alternatively in FIG. 2, shuttle valve 52 is connected to a load sensing port 108 via line 100 while relief valve 102 is connected to supply line 12 and discharge line 68 via line 106.

In operation, when a normal steering mode is commanded, fluid flows from pump port 14 through line 12 to logic element valves 16 and 18. From logic element valves 16 and 18, fluid flows to proportional solenoid valves 20 and 24 via lines 22 and 25, respectively. From valve 20, fluid flows to first port 54 through counterbalance valve 26 to provide pressure to act upon the cylinder of the left rear caster wheel. During this operation, a pressure signal is also sent from line 28 through shuttle valve 34. From valve 34, the signal is sent to logic element valve 16 and to shuttle valve 52 through line 50. Fluid also flows from valve 24 to port 60 through counterbalance valve 38 to provide pressure to act upon the cylinder of the right rear caster wheel. During this operation, a pressure signal is also sent from line 40 through shuttle valve 46. From valve 46, the signal is sent to logic element valve 18 and to shuttle valve 52 through line 51.

Fluid also flows from port 56 through counterbalance valve 30, through valve 20 and back to discharge tank port 98. Likewise, fluid flows from port 64 through counterbalance valve 42 through valve 24 and back to discharge tank port 98. To reverse the direction of the steer, the opposite coil of proportional valves 20 and 24 will be energized, providing pressure to ports 56 and 64 and a path to tank port 98 for ports 54 and 60 respectively in the same manner as previously disclosed.

In this manner, proportional solenoid valves 20 and 24 are compensated by logic element valves 16 and 18 so that steering performance is independent from the load generated by the rear caster wheels. The degree of the steering command will be controlled proportionally by the input current that is applied to valves 20 and 24. A zero current command will result in no steering, while a full current command will result in a full turn command to the caster wheel. When there is no steering commanded, counterbalance valves 26, 30, 38 and 42 and pilot operated check valves 70, 72, 74, and 76 will maintain the position of the rear caster wheels.

When a command is given to allow the rear caster wheels to freewheel, solenoid valves 82 and 88 are energized which sends a pilot signal to open pilot operated check valves 70, 72, 74 and 76. When these valves are opened, fluid from ports 54, 56, 60 and 64 has a free path to and from tank port 98 which allows the rear caster wheels to spin freely.

Additionally in FIG. 1, logic element valve 104 has multiple functions in the system. When no steering is commanded, pressure in line 100 will be minimal. This will allow logic element valve 104 to open a path from line 12 (inlet pressure) to line 68 (tank) and bypass the inlet flow at low pressure. As steering is commanded through energizing valve 20 and/or 24, a pressure signal will be sent from line 28/32 through valve 34 to valve 52 and from line 40/44 through valve 46 to valve 52. Valve 52 will select the higher of the two pressure signals and send this result to logic element valve 104 through line 100. Logic element valve 104 will modulate open and closed based on the highest pressure signal demanded by the steering operation. It will only provide the flow needed by the operation and allow the remainder to bypass from line 12 to 68 at lower pressure with improved efficiency. Logic element valve 104 in conjunction with relief valve 102 will also act to provide system relief protection.

The system disclosed in FIG. 2 will operate in the same way as the system in FIG. 1 with the exception of items 102 and 104. The output of valve 52 will provide a pressure signal to a load-sensing pump via line 100 and port 108. Relief valve 102 is now connected to input line 12 and will provide protection for the system against pressure spikes.

Thus, a control system for steering a rear caster wheel has been disclosed that at the very least meets all the stated objectives.

What is claimed is:

1. A control system for steering a rear caster wheel coupled to a work machine, comprising:
    a hydraulic circuit having a steering mode where fluid pressure is provided to a first and a second rear caster wheel steering cylinder port where the fluid pressure is maintained by the hydraulic circuit when there is a no steering command;
    a freewheeling steering command that removes the fluid pressure from the rear caster wheel steering cylinder port, wherein the fluid pressure to the rear caster wheel steering cylinder port is compensated by logic element valves; and
    the hydraulic circuit includes a fluid supply line connected to a pressure compensation valve that is connected to a proportional solenoid valve, the proportional solenoid valve connected to a first counterbalance valve and a second counterbalance valve, the first counterbalance valve connected to the first rear caster wheel steering cylinder port and a pilot operated check valve, the second counterbalance valve connected to the second rear caster wheel steering cylinder port and another pilot operated check valve.

2. A control system for steering a rear caster wheel coupled to a work machine, comprising:
    a hydraulic circuit having a steering mode where fluid pressure is provided to a rear caster wheel steering cylinder port where the fluid pressure is maintained by the hydraulic circuit when there is a no steering command; and
    a freewheeling steering command that removes the fluid pressure from the rear caster wheel steering cylinder port wherein a plurality of check valves of the hydraulic circuit are piloted open to permit fluid from the rear caster wheel steering cylinder port to have a free path to and from a tank port as a result of the freewheeling steering command.

3. A control system for steering a rear caster wheel coupled to a work machine, comprising:
    a hydraulic circuit having a steering mode where fluid pressure is provided to a left and a right rear caster wheel steering cylinder port where the fluid pressure is maintained by the hydraulic circuit when there is a no steering command; and
    a freewheeling steering command that removes the fluid pressure from the rear caster wheel steering cylinder port wherein the hydraulic circuit comprises a pair of identical hydraulic circuits with one of the hydraulic circuits configured to supply fluid pressure to a left rear caster wheel steering cylinder port and the other hydraulic circuit configured to supply fluid pressure to a right rear caster wheel steering cylinder port wherein a plurality of check valves of the hydraulic circuits are opened to permit fluid from the left and the right rear caster wheel steering cylinder ports to have a free path to and from a tank port as a result of the freewheeling steering command.

\* \* \* \* \*